United States Patent
Yuzawa et al.

(10) Patent No.: US 7,624,586 B2
(45) Date of Patent: Dec. 1, 2009

(54) FREEZING DEVICE

(75) Inventors: Jiro Yuzawa, Gunma-ken (JP); Fukuji Yoshida, Ota (JP); Susumu Kobayashi, Gunma-ken (JP); Minoru Suto, Ota (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 243 days.

(21) Appl. No.: 11/580,905

(22) Filed: Oct. 16, 2006

(65) Prior Publication Data

US 2007/0084224 A1   Apr. 19, 2007

(30) Foreign Application Priority Data

Oct. 17, 2005   (JP)   ............... 2005-301685

(51) Int. Cl.
*C09K 5/04*   (2006.01)
*C09K 5/00*   (2006.01)

(52) U.S. Cl. ............... 62/114; 252/67; 252/68

(58) Field of Classification Search ............... 62/114, 62/498; 252/67, 68, 70; 141/82
See application file for complete search history.

(56) References Cited

U.S. PATENT DOCUMENTS

| | | | | |
|---|---|---|---|---|
| 4,788,829 A | * | 12/1988 | Takemasa et al. | ............... 62/335 |
| 5,265,443 A | * | 11/1993 | Yuzawa et al. | ............... 62/498 |
| 6,640,841 B2 | * | 11/2003 | Thomas et al. | ............... 141/1 |
| 6,951,115 B2 | * | 10/2005 | Yuzawa | ............... 62/114 |
| 2004/0031538 A1 | * | 2/2004 | Richard et al. | ............... 141/19 |
| 2004/0107708 A1 | * | 6/2004 | Yuzawa | ............... 62/114 |
| 2005/0086950 A1 | | 4/2005 | Khatri | ............... 62/114 |
| 2006/0123805 A1 | | 6/2006 | Yuzawa | ............... 62/114 |

FOREIGN PATENT DOCUMENTS

| | | |
|---|---|---|
| EP | 1136540 | 9/2001 |
| GB | 2394719 | 5/2004 |
| JP | 2003-13049 | 1/2003 |
| JP | 2003-13050 | 1/2003 |
| WO | WO02/26913 | 4/2002 |
| WO | WO2004/050788 | 6/2004 |

* cited by examiner

*Primary Examiner*—Cheryl J Tyler
*Assistant Examiner*—Cassey Bauer
(74) *Attorney, Agent, or Firm*—Kratz, Quintos & Hanson, LLP

(57) ABSTRACT

An object is to provide a freezing device in which a safely-treatable incombustible mixed refrigerant can be used and which can realize an extremely low temperature of −85° C. or less in chamber by a simple structure. The freezing device comprises a single refrigerant circuit in which the refrigerant discharged from a compressor is condensed and thereafter evaporated to exert a cooling function and which allows heat exchange between the evaporated refrigerant and the condensed refrigerant, wherein there is introduced into the refrigerant circuit a non-azeotropic mixed refrigerant containing R245fa, R600, R23 and R14; a non-azeotropic mixed refrigerant containing R245fa, R600, R116 and R14; a non-azeotropic mixed refrigerant containing R245fa, R600, R508A and R14; or a non-azeotropic mixed refrigerant containing R245fa, R600, R508B and R14.

4 Claims, 6 Drawing Sheets

FREEZING DEVICE

BACKGROUND OF THE INVENTION

The present invention relates to a freezing device constituted of a single refrigerant circuit in which a refrigerant discharged from a compressor is condensed and then evaporated to exert a cooling function.

Heretofore, a so-called Freon has broadly been used as a refrigerant for use in a refrigerator or a freezer. However, a specific Freon containing chlorine destroys ozone in an upper region of the atmosphere, many Freons influence global warming as a greenhouse-effect gas, and the Freon is an object whose use is restricted. Therefore, there is demanded the development of a replaceable refrigerant composition capable of maintaining the performance of the refrigerant without any danger that the ozone layer is destroyed and without changing a conventional freezing circuit.

The refrigerant which can be used is required to have characteristics that physical properties such as its composition and boiling point do not change during vaporization or condensation of the gas and that compatibility with an oil (an alkyl benzene) for use as a lubricant is high. In addition, it is required that the boiling point of the refrigerant be sufficiently low in consideration of a relation between the boiling point and a targeted temperature in chamber and that a critical temperature be high for a smooth operation under a room-temperature environment. Therefore, it is very difficult that such requirements are satisfied by the refrigerant gas of a single component.

To solve the problem, a mixed refrigerant constituted of two or more of components has heretofore been used, and properties such as the boiling point of the mixed refrigerant are adjusted by selecting the components to be mixed. Especially, to make it possible to realize an extremely low temperature below −80° C. in chamber, a non-azeotropic mixed refrigerant constituted of two or more of components is used. It is difficult to liquefy components each having a low boiling point and a low critical temperature by a capability of a condenser which operates under the room-temperature environment, and therefore, a multistage system or the like is employed in which the refrigerant components are condensed in multiple stages.

However, in the multistage freezing system, a structure is complicated and enlarged, and maintenance becomes difficult, which leads to a problem that a running cost remarkably increases.

To solve the problem, heretofore, there have been developed a non-azeotropic mixed refrigerant containing butane, ethylene and R14 (carbon tetrafluoride: $CF_4$) (see Japanese Patent Application Laid-Open No. 2003-13049), and a non-azeotropic mixed refrigerant containing butane, ethane and R14 (see Japanese Patent Application Laid-Open No. 2003-13050). According to these non-azeotropic mixed refrigerant gases, a treating property of the refrigerant in the freezer is secured by an operability of butane having a high boiling point at normal temperature, and the extremely low temperature is realized by ethane or ethylene having a remarkably low boiling point. In consequence, the temperature in chamber can be set to −60° C. or less without using any complicated multistage freezing system.

However, in the above-described conventional non-azeotropic mixed refrigerant, a combustible gas such as ethylene or ethane is used. Especially, to realize an extremely low temperature of −60° C. or less in chamber, at least a mixture ratio of ethane or ethylene in a mixture of butane and ethane or ethylene has to be 10% or more, and a state of the non-azeotropic mixed refrigerant remains in a combustible region. Therefore, there has been a problem that the combustible mixed refrigerant has an unsatisfactory reliability in respect of safety, and has a very unsatisfactory treating property.

SUMMARY OF THE INVENTION

The present invention has been developed to solve the conventional technical problem, and an object is to provide a freezing device in which a safely-treatable incombustible mixed refrigerant can be used and which can realize an extremely low temperature of −85° C. or less in chamber by a simple structure.

In a first invention of the present application, a freezing device comprises: a single refrigerant circuit in which a refrigerant discharged from a compressor is condensed and then evaporated to exert a cooling function and which allows heat exchange between the evaporated refrigerant and the condensed refrigerant, wherein there is introduced into the refrigerant circuit: a non-azeotropic mixed refrigerant containing R245fa, R600, R23 and R14; a non-azeotropic mixed refrigerant containing R245fa, R600, R116 and R14; a non-azeotropic mixed refrigerant containing R245fa, R600, R508A and R14; or a non-azeotropic mixed refrigerant containing R245fa, R600, R508B and R14.

In a second invention of the present application, the freezing device of the above invention is characterized in that with respect to a total weight of the non-azeotropic mixed refrigerant, a total weight ratio of the refrigerants R245fa and R600 is set to a range of 40 wt % to 80 wt %, a weight ratio of the refrigerant R23, R116, R508A or R508B is set to a range of 15 wt % to 47 wt %, and a weight ratio of the refrigerant R14 is set to a range of 3 wt % to 20 wt %.

In a third invention of the present application, the freezing device of the above invention is characterized in that with respect to the total weight of the non-azeotropic mixed refrigerant, the total weight ratio of the refrigerants R245fa and R600 is set to a range of 49 wt % to 70 wt %, the weight ratio of the refrigerant R23, R116, R508A or R508B is set to a range of 21 wt % to 42 wt %, and the weight ratio of the refrigerant R14 is set to a range of 9 wt % to 20 wt %.

In a fourth invention of the present application, the freezing device of the above invention is characterized in that with respect to the total weight of the non-azeotropic mixed refrigerant, the total weight ratio of the refrigerants R245fa and R600 is set to 64 wt %, the weight ratio of the refrigerant R23, R116, R508A or R508B is set to 24 wt %, and the weight ratio of the refrigerant R14 is set to 12 wt %.

According to the first invention of the present application, in the freezing device comprising the single refrigerant circuit in which the refrigerant discharged from the compressor is condensed and then evaporated to exert the cooling function and which allows the heat exchange between the evaporated refrigerant and the condensed refrigerant, there is introduced into the refrigerant circuit: the non-azeotropic mixed refrigerant containing R245fa, R600, R23 and R14; the non-azeotropic mixed refrigerant containing R245fa, R600, R116 and R14; the non-azeotropic mixed refrigerant containing R245fa, R600, R508A and R14; or the non-azeotropic mixed refrigerant containing R245fa, R600, R508B and R14. Accordingly, it is possible to realize an extremely low temperature of −80° C. or less in chamber as a cooling object by various types of comparatively inexpensive refrigerants without using any Freon refrigerant whose use is restricted. In consequence, when the temperature of −80° C. or less is realized in chamber, long-period storage of a food, a living tissue, a specimen or the like can further be stabilized, and reliability can be enhanced.

Especially, according to the present invention, even when a refrigerant composition is changed, a performance of a conventional freezing circuit can be maintained without changing the freezing circuit. Moreover, it is possible to cope with an environmental problem such as destruction of the ozone layer. In the present invention, the extremely low temperature can be realized by a single-stage type freezing system without using the so-called multistage freezing system. In consequence, the device can be simplified, and a production cost can be reduced.

Furthermore, since the non-azeotropic mixed refrigerant for use in the present invention is incombustible, it can be used safely. A treating property of the refrigerant is enhanced. Moreover, it is possible to avoid a disadvantage that the mixed refrigerant burns in a case where the refrigerant leaks owing to breakage of refrigerant piping or the like.

Especially as in the second invention, with respect to the total weight of the non-azeotropic mixed refrigerant, the total weight ratio of the refrigerants R245fa and R600 is set to the range of 40 wt % to 80 wt %, the weight ratio of the refrigerant R23, R116, R508A or R508B is set to the range of 15 wt % to 47 wt %, and the weight ratio of the refrigerant R14 is set to the range of 3 wt % to 20 wt %. It is more preferable that as in the third invention, with respect to the total weight of the non-azeotropic mixed refrigerant, the total weight ratio of R245fa and R600 is set to the range of 49 wt % to 70 wt %, the weight ratio of R23, R116, R508A or R508B is set to the range of 21 wt % to 42 wt %, and the weight ratio of R14 is set to the range of 9 wt % to 20 wt %. It is further preferable that as in the fourth invention, with respect to the total weight of the non-azeotropic mixed refrigerant, the total weight ratio of R245fa and R600 is set to 64 wt %, the weight ratio of R23, R116, R508A or R508B is set to 24 wt %, and the weight ratio of R14 is set to 12 wt %. In consequence, it is possible to stably realize a temperature of −80° C. or less in chamber. The long-period storage of the food, the living tissue, the specimen or the like can further be stabilized, and the reliability can be enhanced.

Furthermore, since the non-azeotropic mixed refrigerant is surely constituted to be incombustible, it is possible to more effectively avoid a disadvantage that the refrigerant burns when it leaks.

DETAILED DESCRIPTION OF THE PREFERRED EMBODIMENTS

Figure 1:
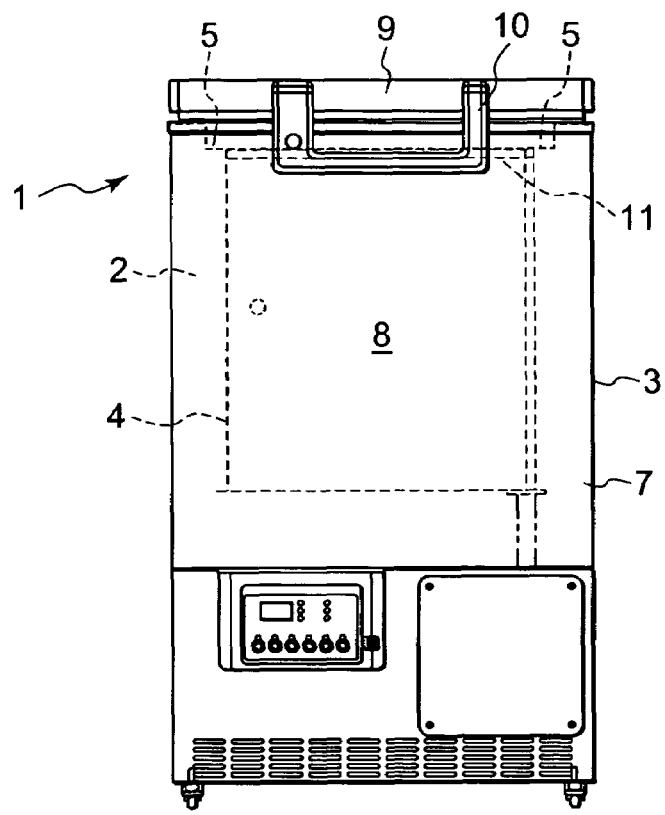
FIG. 1 is a front view of an extremely-low-temperature freezer to which a freezing device is applied.
Figure 2:
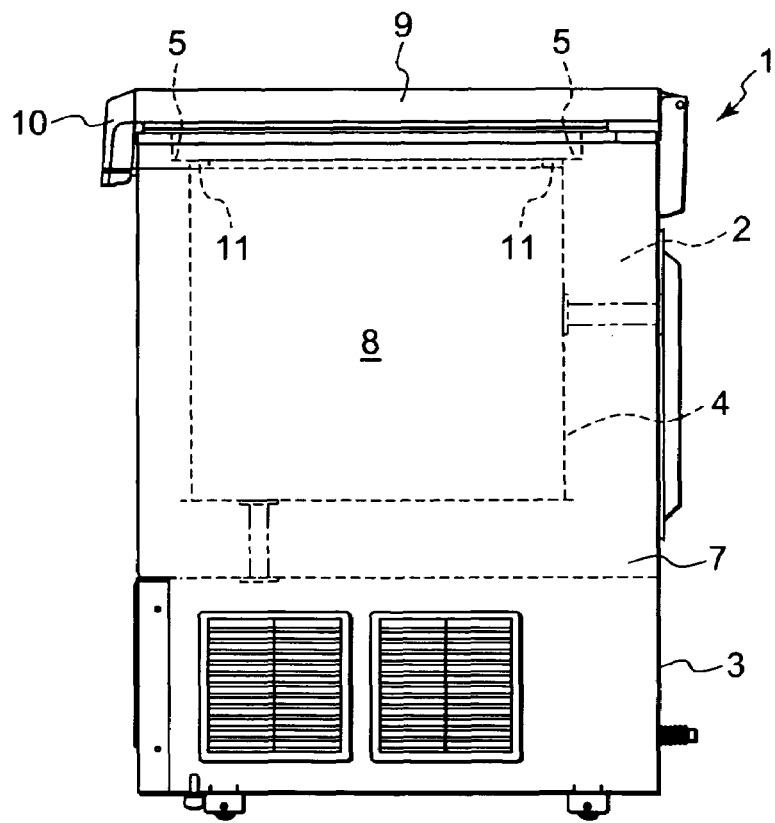
FIG. 2 is a side view of FIG. 1.
Figure 3:
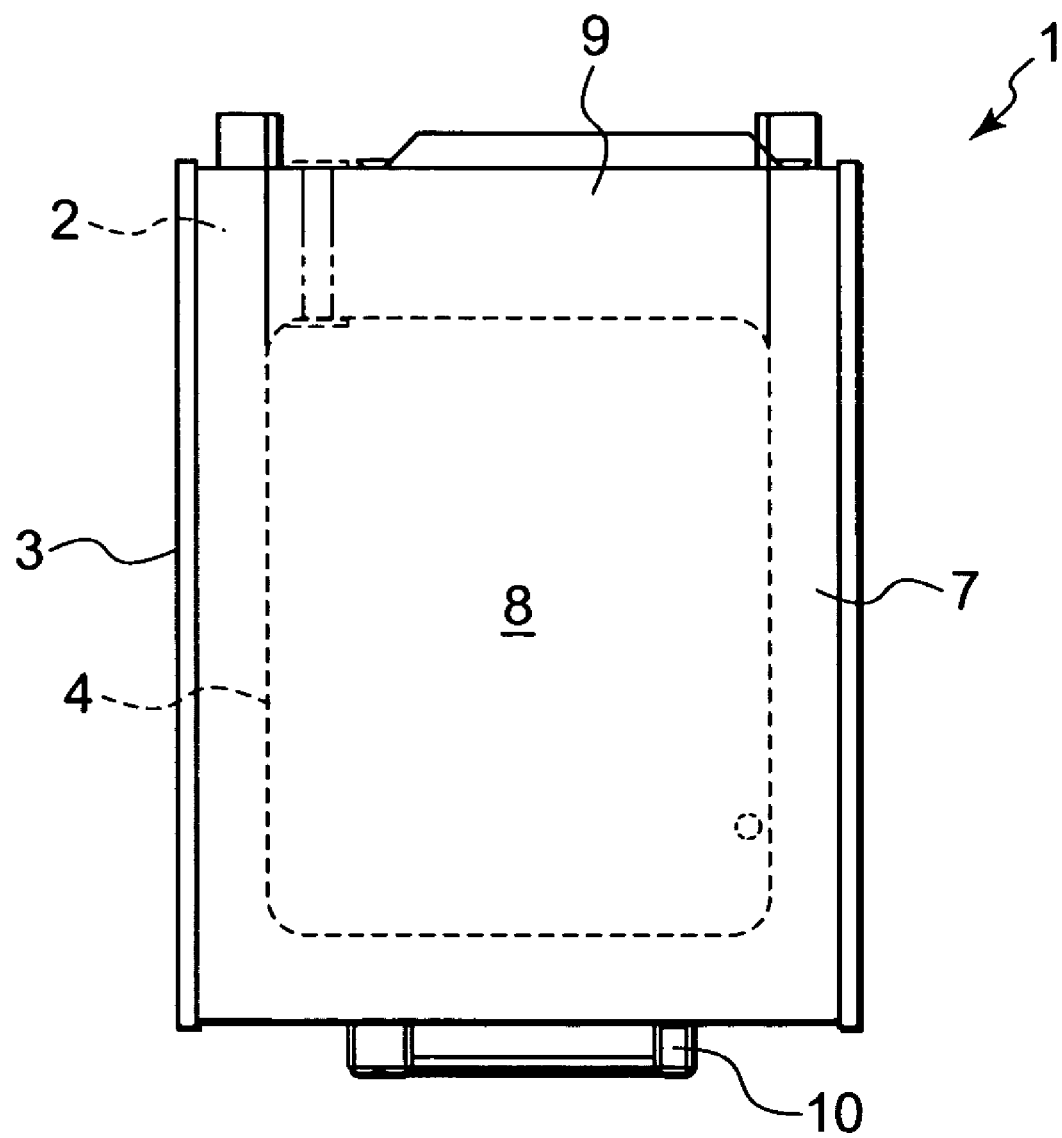
FIG. 3 is a plan view of FIG. 1.

Embodiments of the present invention will be described hereinafter in detail with reference to the drawings. An extremely-low-temperature storage 1 of the present embodiment is used in, for example, storing a frozen food to be stored at a low temperature over a long period or storing a living tissue, a specimen or the like at an extremely low temperature. A main body of the storage is constituted of an insulating box article 2 having its top opened.

This insulating box article 2 is constituted of: an outer box 3 made of a steel plate and an inner box 4, the boxes having tops opened; breakers 5 made of a synthetic resin and connecting upper ends of the box 3 to those of the box 4, respectively; and a polyurethane resin insulating material 7 with which a space enclosed by the outer box 3, the inner box 4 and the breakers 5 is filled by an on-site foaming system. The inside of the inner box 4 is a storage chamber 8 having its top opened.

In the present embodiment, to set a targeted temperature in the storage chamber 8 (hereinafter referred to as the temperature in chamber) at, for example, −80° C. or less, the insulating box article 2 which separates the inside of the storage chamber 8 from outside air requires a great insulating capability as compared with a low-temperature storage having the temperature in chamber set in the vicinity of 0° C. Therefore, to secure the insulating capability by the only polyurethane resin insulating material 7, the material has to be formed into a considerable thickness, and there is a problem that a sufficient storage amount of the storage chamber 8 cannot be secured with a limited main-body dimension. To solve the problem, in the insulating box article 2 of the present embodiment, a vacuum insulating material of a glass wool is disposed on an inner wall surface of the outer box 3, and a thickness dimension of the polyurethane resin insulating material 7 is reduced in accordance with the insulating capability of the vacuum insulating material.

Moreover, the tops of the breakers 5 are formed into staircase-like shapes, and an insulating door 9 is attached to the breakers via packing members 11 so as to be rotatable centering on one end, that is, a rear end in the present embodiment. Accordingly, an opening in the top of the storage chamber 8 is openably closed by the insulating door 9. A handle portion 10 is disposed on the other end of the insulating door 9, that is, a front end thereof in the present embodiment. When the handle portion 10 is operated, the insulating door 9 is opened or closed.

Figure 4:
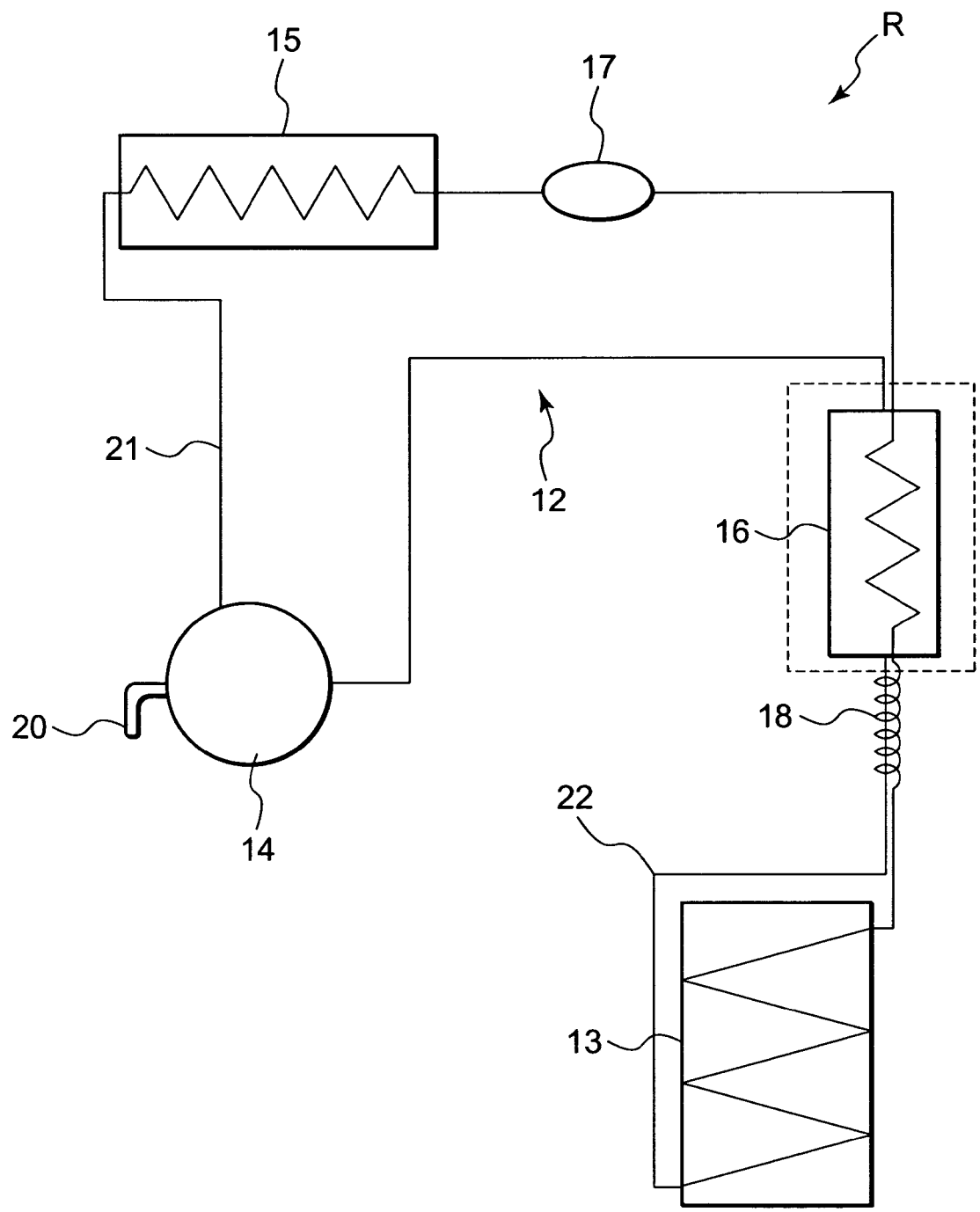
FIG. 4 is a refrigerant circuit diagram in the present embodiment.
Figure 5:
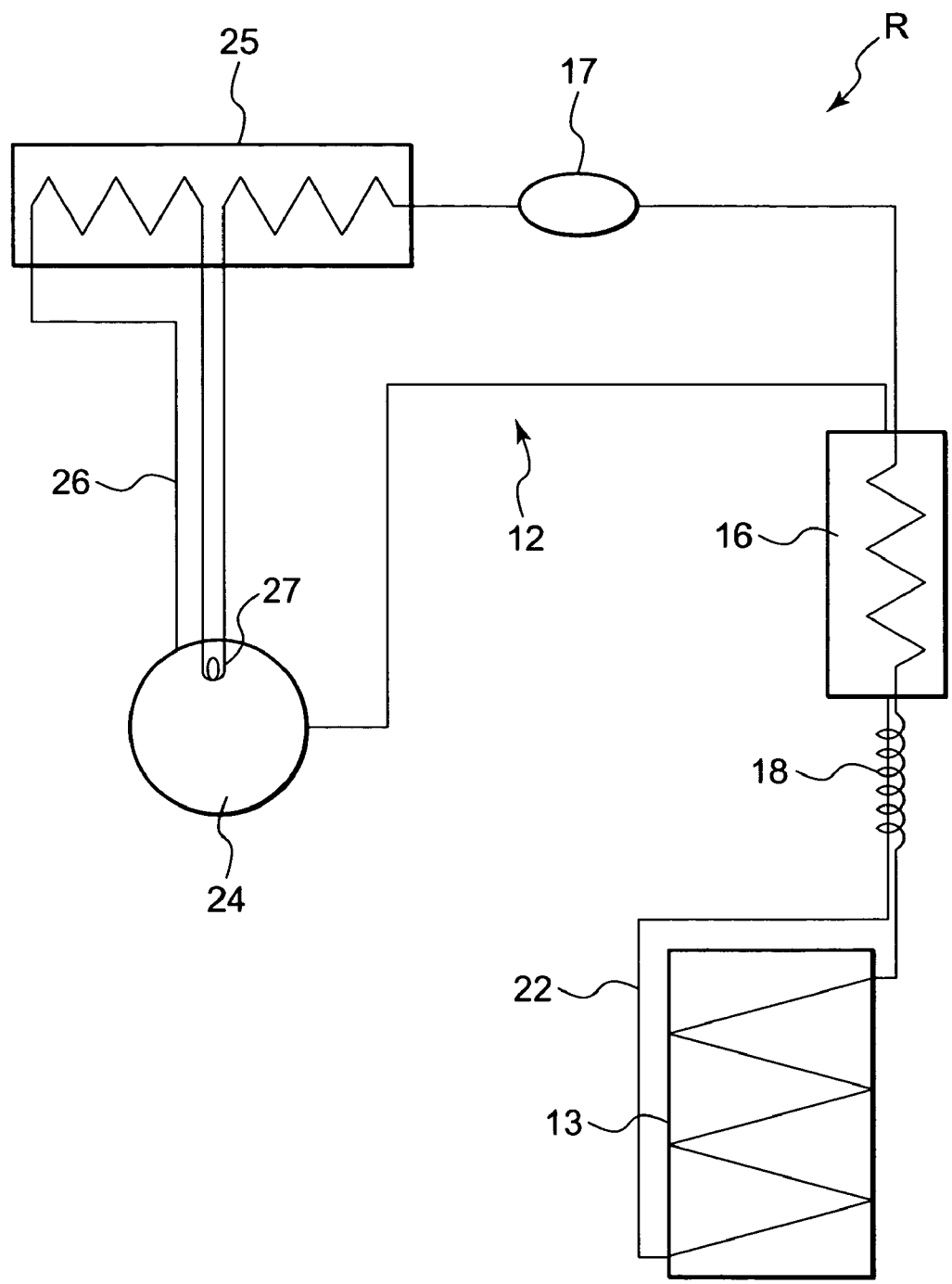
FIG. 5 is a refrigerant circuit diagram in another embodiment.

Furthermore, an evaporator (refrigerant pipe) 13 constituting a refrigerant circuit of a freezing device R is heat-exchangeably attached to the peripheral surface of the inner box 4 on the side of the insulating material 7. A mechanical chamber (not shown) is constituted in a lower part of the insulating box article 2. In this mechanical chamber, a compressor 14, a condenser 15, a blower (not shown) for air-cooling the compressor 14 and the condenser 15 and the like are arranged to constitute a refrigerant circuit 12 of the freezing device R. Moreover, the compressor 14, the condenser 15, a drier 17, a heat exchanger 16, a capillary tube 18 as a pressure reducing unit and the evaporator 13 are successively annularly connected to one another by piping as shown in FIG. 4 or 5, thereby constituting the refrigerant circuit 12 of the freezing device R. It is to be noted that the heat exchanger 16 is disposed in the insulating material 7.

FIG. 4 is a refrigerant circuit diagram in which the rotary compressor 14 is used. The compressor 14 is connected to a sub-cooler 20, and is constituted to discharge, to a refrigerant discharge tube 21, a refrigerant which has once released heat in the outside and then again returned into a shell of a sealed container to be compressed again. The compressor 14 on a discharge side is connected to the condenser 15 via the refrigerant discharge tube 21, and the condenser 15 on an outlet side is successively connected to the drier 17, the heat exchanger 16 and the capillary tube 18 as pressure reducing means. The capillary tube 18 on the outlet side is connected to the evaporator 13. The evaporator 13 on the outlet side is connected to the compressor 14 on a suction side via a return pipe 22 and the heat exchanger 16.

In the present embodiment, the refrigerant circuit 12 is filled with a mixed refrigerant of R245fa and R600 and a non-azeotropic mixed refrigerant of R23 and R14. The refrigerant R245fa is pentafluoropropane ($CHF_2CH_2CF_3$) having a boiling point of +15.3° C., and R600 is a butane ($C_4H_{10}$) having a boiling point of −0.5° C. The refrigerant R600 has a function of feeding a lubricant of the compressor 14 and a mixed moisture that cannot be absorbed by the drier 17 back into the compressor 14 in a state in which the lubricant and the moisture are dissolved in the refrigerant. However, R600 is a combustible substance. Therefore, when R600 is mixed with incombustible R245fa at a predetermined ratio of R245fa/R600=70/30 in the present embodiment, the mixed refrigerant can be treated as an incombustible refrigerant. Moreover, R23 is trifluoromethane ($CHF_3$) having a boiling point of −82.1° C., and R14 is tetrafluoromenthane ($CF_4$) having a boiling point of −127.9° C.

Furthermore, in a composition of these mixed refrigerants in the present embodiment, the mixed refrigerant of R245fa and R600 occupies 64 wt % of the whole composition, R23 occupies 24 wt %, and R14 occupies 12 wt %.

In the above constitution, a high-temperature gas-like refrigerant discharged from the compressor 14 is once discharged from the sealed container to the sub-cooler 20 via the refrigerant discharge tube on the side of the sub-cooler 20. After releasing its heat, the refrigerant again returns into the shell of the sealed container, and is discharged to the condenser 15 via the refrigerant discharge tube 21.

The high-temperature gas-like refrigerant which has flowed through the condenser 15 is condensed to release its heat, and liquefied. The moisture contained in the refrigerant is then removed by the drier 17. The refrigerant then flows through the heat exchanger 16 to allow the heat exchange between the refrigerant and a low-temperature refrigerant in the heat-exchangeably disposed return pipe 22. Accordingly, an uncondensed refrigerant is cooled, condensed and liquefied in the heat exchanger 16. Therefore, the pressure of the mixed refrigerant passed through the heat exchanger 16 is reduced by the capillary tube 18. Subsequently, when the mixed refrigerant flows through the evaporator 13, the refrigerants R14, R23 evaporate. The refrigerant performs its cooling function in the evaporator 13, and an ambient temperature around this evaporator 13 is set to −85° C. to realize an extremely low temperature of −80° C. in chamber. The refrigerant passed from the heat exchanger 16 returns to the compressor 14 by the return pipe 22.

At this time, a capability of the compressor 14 is 425 W, and a temperature to be finally reached by the evaporator 13 being operated is −100° C. to −60° C. At such a low temperature, the boiling point of R245fa in the refrigerant is +15.3° C., and the boiling point of R600 is −0.5° C. Therefore, the refrigerant remains in a liquid state in the evaporator 13 without being evaporated, and therefore hardly contributes to the cooling. However, R600 performs a function of feeding the lubricant of the compressor 14 and the mixed moisture that cannot be absorbed by the drier 17 back to the compressor 14 in a state in which they are dissolved in the refrigerant, and a function of lowering the temperature of the compressor 14 by the evaporation of the liquid refrigerant in the compressor 14.

Figure 6:
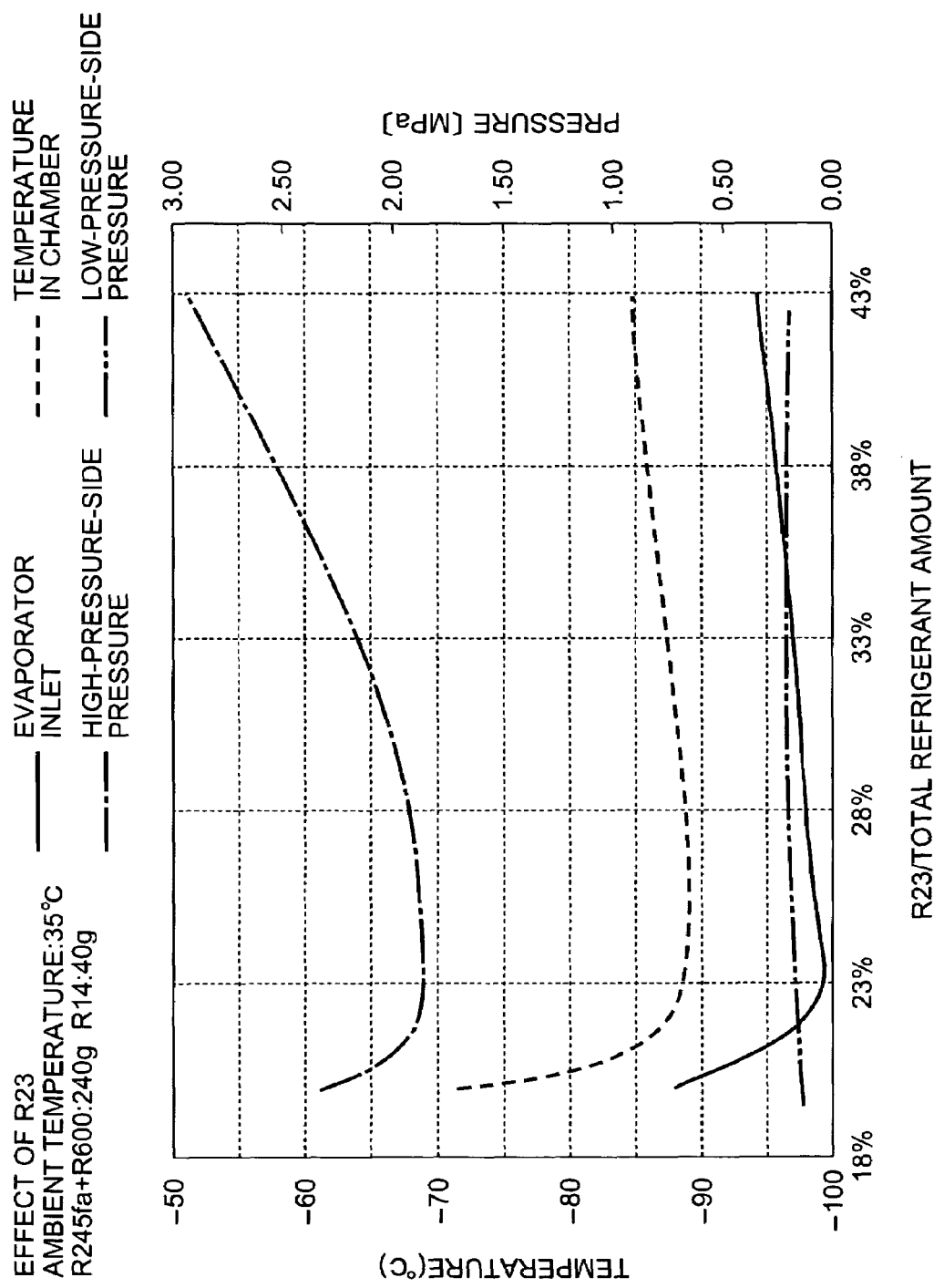
FIG. 6 is a graph concerning data in a case where a weight of a mixed refrigerant of R245fa and R600 and a weight of R14 are set to be constant, and a weight of R23 is changed.
Figure 7:
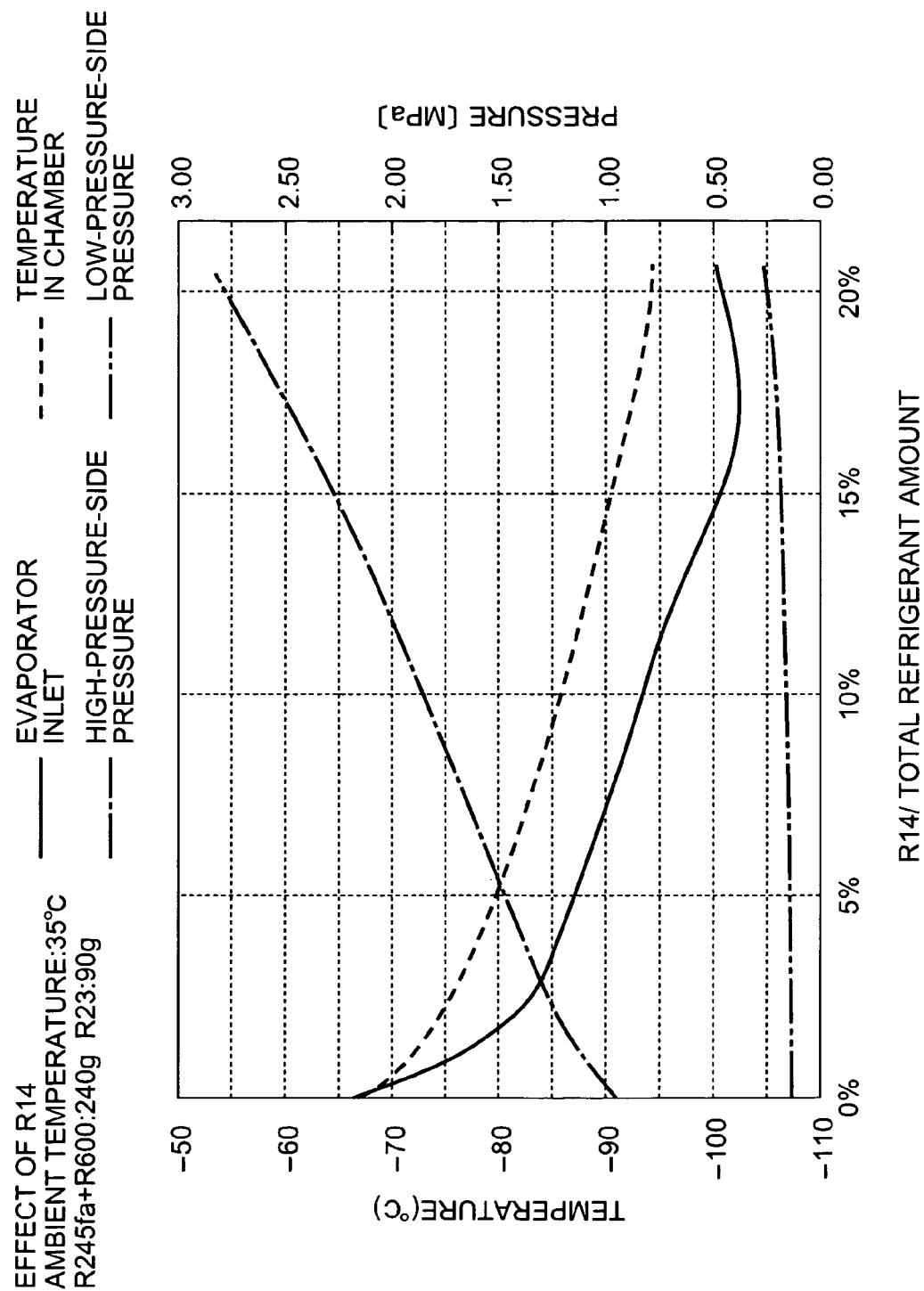
FIG. 7 is a graph concerning data in a case where the weight of the mixed refrigerant of R245fa and R600 and the weight of R23 are set to be constant, and the weight of R14 is changed.

An evaporation temperature in the evaporator 13 differs with a composition ratio of the non-azeotropic mixed refrigerant to be introduced into the refrigerant circuit 12. There will be described hereinafter in detail an evaporator temperature, a temperature in chamber, a high-pressure-side pressure and a low-pressure-side pressure with respect to the composition ratios of the refrigerants based on experiment results. FIG. 6 is a graph showing an evaporator inlet temperature, the temperature in chamber, the high-pressure-side pressure and the low-pressure-side pressure in a case where a weight of the mixed refrigerant of R245fa and R600 and the weight of R14 are set to be constant, and a weight of R23 is changed. FIG. 7 is a graph showing the evaporator inlet temperature, the temperature in chamber, the high-pressure-side pressure and the low-pressure-side pressure in a case where the weight of the mixed refrigerant of R245fa and R600 and the weight of R23 are set to be constant, and the weight of R14 is changed.

According to an experiment result of FIG. 6, a weight ratio of R23 is increased from 20.0 wt % to 42.0 wt % with respect to a total weight of the refrigerants to be introduced. According to this result, in a case where the weight ratio of R23 is 20.0 wt % which is regarded as the minimum amount in such an experiment, the inlet temperature of the evaporator 13 is −88.0° C., whereas the temperature in chamber is −71.0° C. On the other hand, when the weight ratio of R23 is 21.3 wt %, the inlet temperature of the evaporator 13 rapidly drops to −95.9° C., and the temperature in chamber also drops to −87.5° C. While the weight ratio of R23 is then increased to 42.0 wt %, the temperature only slightly rises. At any weight ratio, the temperature in chamber can be set to about −85° C. or less.

Moreover, according to an experiment result of FIG. 7, a weight ratio of R14 is increased from 0.0 wt % to 14.1 wt % with respect to the total weight of the refrigerants to be introduced. According to this result, in a case where the weight ratio is 0.0 wt % which is regarded as the minimum amount in such an experiment, that is, R14 is not contained, the inlet temperature of the evaporator 13 is −66.1° C., whereas the temperature in chamber is −66.9° C. On the other hand, when the weight ratio of R14 is 1.8 wt %, the inlet temperature of the evaporator 13 rapidly drops to −80.2° C., and the temperature in chamber also drops to −74.1° C. When the weight ratio of R14 is gradually increased to 14.1 wt % in the present experiment, the inlet temperature of the evaporator 13 drops to −98.90° C., and the temperature in chamber also drops to −90.0° C. Since the boiling point of R14 is −129.7° C., it is expected that when the weight ratio of R14 is then increased, the temperature of the evaporator 13 and the temperature in chamber further drop.

However, as seen from the graph of FIG. 7, when the weight ratio of R14 increases, the high-pressure-side pressure rises. Therefore, when the weight ratio of R14 is further increased to 20 wt % or more, a problem occurs that the high-pressure-side pressure reaches an excessively high pressure of, for example, 3 MPa or more. The rise of the high-pressure-side pressure results in a problem that breakage of a unit such as the compressor 14 is incurred or that a starting property of the compressor 14 is deteriorated. Therefore, in order to set the temperature in chamber to a preferable target temperature of −75° C. or less, it is preferable to set the weight ratio of R14 to 3 wt % to 20 wt % of the total refrigerant amount.

It is to be noted that as described above, the boiling point of R23 is −82.1° C. Therefore, the temperature of the evaporator 13 below the boiling point cannot be achieved by the only refrigerant R23. However, when a predetermined amount, for example, about 5 wt % or more of R14 having a remarkably low boiling point is added as in the present invention, the cooling function of R14 can regularly realize an extremely low evaporation temperature of −80° C. or less in the evaporator 13.

According to the above experiment results, when with respect to the total weight of the non-azeotropic mixed refrigerant to be introduced into the refrigerant circuit 12, the total weight ratio of the mixed refrigerant of R245fa and R600 is set to 40 wt % to 80 wt %, the weight ratio of R23 is set to 15 wt % to 47 wt %, and the weight ratio of R14 is set to 3 wt % to 20 wt %, an extremely low temperature of −70° C. or less can be realized in chamber by the incombustible non-azeotropic mixed refrigerant. Especially, when with respect to the total weight of the non-azeotropic mixed refrigerant to be introduced into the refrigerant circuit 12, the total weight ratio of the mixed refrigerant of R245fa and R600 is set to 49 wt % to 70 wt %, the weight ratio of R23 is set to 21 wt % to 42 wt %, and the weight ratio of R14 is set to 9 wt % to 20 wt %, an extremely low temperature of −85° C. or less can be realized in chamber by the incombustible non-azeotropic mixed refrigerant.

In consequence, long-period storage of a food, a living tissue, a specimen or the like can further be stabilized, and reliability can be enhanced. Since the non-azeotropic mixed refrigerant is incombustible, it can be used safely. A treating property of the refrigerant is enhanced. Moreover, it is possible to avoid a disadvantage that the mixed refrigerant burns in a case where the refrigerant leaks owing to breakage of refrigerant piping or the like.

Especially, when composition ratios of components of the non-azeotropic mixed refrigerant are set to 64 wt % of the mixed refrigerant of R245fa and R600, 24 wt % of R23 and 12 wt % of R14, it is possible to realize an extremely low temperature of −80° C. or less in chamber. In consequence, the food, the living tissue, the specimen and the like can more stably be stored for a long period, and reliability of the device can be enhanced.

It is to be noted that the refrigerant of the present invention is not limited to R23. For example, even when R116 (hexafluoroethane: $CF_3CF_3$) having a boiling point of −78.4° C., or R508A (R23/R116=39/61, boiling point: −85.7° C.) or R508B (R23/R116=46/54, boiling point: −86.9° C.) constituted by mixing R23 and R116 at a predetermined ratio is used, a similar effect can be produced.

Moreover, in a case where the non-azeotropic mixed refrigerant is used as in the present invention, even when the refrigerant composition is changed, the performance of the conventional refrigerant circuit can be maintained without changing the circuit. Moreover, it is possible to cope with an environmental problem such as destruction of the ozone layer. Further in the present invention, since the extremely low temperature can be realized by a single-stage type freezing system without using a so-called multistage freezing system. Therefore, the device can be simplified, and a production cost can be reduced.

It is to be noted that in the present embodiment, as the compressor, the rotary compressor 14 shown in FIG. 4 is used, but a reciprocating compressor 24 shown in FIG. 5 may be used. That is, as shown in FIG. 5, the compressor 24 on a discharge side is connected to a condenser 25 via a refrigerant discharge tube 26. In a middle stage of this condenser 25, an oil cooler 27 partially drawn into the compressor 24 is disposed. Moreover, the oil cooler 27 on an outlet side of this condenser 25 is successively connected to a drier 17, a heat exchanger 16 and a capillary tube 18 as pressure reducing means. The capillary tube 18 on an outlet side is connected to an evaporator 13, and the evaporator 13 on an outlet side is connected to the compressor 24 on a suction side via a return pipe 22 and the heat exchanger 16.

In such a constitution, a high-temperature gas-like refrigerant discharged from the compressor 24 is discharged to the condenser 25 via the refrigerant discharge tube 26. The refrigerant which has released heat to be partially liquefied in the condenser 25 cools an oil of the compressor 24 in the oil cooler 27. Then, in the subsequent-stage condenser 25, the refrigerant releases its heat and is liquefied.

After the high-temperature gas-like refrigerant is condensed to release its heat and liquefied in the condenser 25, a moisture contained in the refrigerant is removed by the drier 17. The refrigerant flows through the heat exchanger 16, thereby allowing the heat exchange between the refrigerant and a low-temperature refrigerant in the heat-exchangeably disposed return pipe 22. Accordingly, an uncondensed refrigerant is cooled, condensed and liquefied in the heat exchanger 16. Therefore, in the same manner as in the above embodiment, the pressure of the mixed refrigerant passed through the heat exchanger 16 is reduced by the capillary tube 18. Subsequently, the mixed refrigerant flows through the evaporator 13, and the refrigerants R14, R23 evaporate. The refrigerant performs its cooling function in the evaporator 13, and an ambient temperature around this evaporator 13 is set to −85° C. to realize an extremely low temperature of −80° C. in chamber. The refrigerant passed through the heat exchanger 16 returns to the compressor 24 by the return pipe 22.

Thus, the compressor for use in the present invention is not limited to the rotary type. For example, even the reciprocating compressor can produce a similar effect.

It is to be noted that when the heat exchanger 16 is not used in each embodiment, the temperature of a compressed gas may be lowered in the above-described temperature range by another well-known cooling means to proceed with a targeted condensing process.

What is claimed is:

1. A freezing device comprising:
a single refrigerant circuit in which a refrigerant discharged from a compressor is condensed and then evaporated to exert a cooling function and which allows heat exchange between the evaporated refrigerant and the condensed refrigerant,
wherein there is introduced into the refrigerant circuit:
a non-chlorine-containing and a non-azeotropic mixed refrigerant containing R245fa, R600, R23 and R14;
a non-chlorine-containing and a non-azeotropic mixed refrigerant containing R245fa, R600, R116 and R14;
a non-chlorine-containing and a non-azeotropic mixed refrigerant containing R245fa, R600, R508A and R14; or
a non-chlorine-containing and a non-azeotropic mixed refrigerant containing R245fa, R600, R508B and R14; wherein
with respect to a total weight of the non-azeotropic mixed refrigerant,
a total weight ratio of the refrigerants R245fa and R600 is set to a range of 40 wt % to 80 wt %, a weight ratio of the refrigerant R23, R116, R508A or R508B is set to a range of 15 wt % to 47 wt %, and a weight ratio of the refrigerant R14 is set to a range of 3 wt % to 20 wt %; and wherein R245fa and R600 are mixed at a ratio so as to be incombustible.

2. The freezing device according to claim 1, wherein R245fa and R600 are mixed at a weight ratio of R245fa/R600 equals 70/30.

3. The freezing device according to claim 2, wherein with respect to the total weight of the non-azeotropic mixed refrigerant, the total weight ratio of the refrigerants R245fa and R600 is set to a range of 49 wt % to 70 wt %;

the weight ratio of the refrigerant R23, R116, R508A or R508B is set to a range of 21 wt % to 42 wt %, and the weight ratio of the refrigerant R14 is set to a range of 9 wt % to 20 wt %.

4. The freezing device according to claim 3, wherein with respect to the total weight of the non-azeotropic mixed refrigerant, the total weight ratio of the refrigerants R245fa and R600 is set to 64 wt %, the weight ratio of the refrigerant R23, R116, R508A or R508B is et to 24 wt %, and the weight ratio of the refrigerant R14 is set to 12 wt %.

* * * * *